United States Patent
Hasegawa

(10) Patent No.: US 9,421,810 B2
(45) Date of Patent: *Aug. 23, 2016

(54) PAGE-TURNING DEVICE AND DOCUMENT CAMERA SYSTEM

(71) Applicant: CASIO COMPUTER CO., LTD., Shibuya-ku, Tokyo (JP)

(72) Inventor: Hirokazu Hasegawa, Koganei (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/641,959

(22) Filed: Mar. 9, 2015

(65) Prior Publication Data

US 2015/0174942 A1 Jun. 25, 2015

Related U.S. Application Data

(62) Division of application No. 14/094,295, filed on Dec. 2, 2013, now Pat. No. 8,982,428.

(30) Foreign Application Priority Data

Dec. 18, 2012 (JP) .................................. 2012-275300

(51) Int. Cl.
  *H04N 1/04* (2006.01)
  *B42D 9/04* (2006.01)
  *B42D 9/06* (2006.01)
  *H04N 1/00* (2006.01)

(52) U.S. Cl.
  CPC . *B42D 9/04* (2013.01); *B42D 9/06* (2013.01); *H04N 1/00567* (2013.01); *H04N 2201/0084* (2013.01); *H04N 2201/0434* (2013.01)

(58) Field of Classification Search
  CPC ....... B42D 9/04; B42D 9/06; H04N 1/00567
  USPC ....... 358/471, 474, 486, 488, 401, 505, 501, 358/909.1
  See application file for complete search history.

(56) References Cited

U.S. PATENT DOCUMENTS

| 4,663,873 A | 5/1987 | Shinbrot |
| 4,936,034 A * | 6/1990 | Chen et al. ..................... 40/531 |
| 5,471,277 A | 11/1995 | Fujioka et al. |

(Continued)

FOREIGN PATENT DOCUMENTS

| CN | 1695368 A | 11/2005 |
| JP | 05155179 A | 6/1993 |
| JP | 10136132 A | 5/1998 |

OTHER PUBLICATIONS

Chinese Office Action (and English translation thereof) dated Apr. 3, 2015, issued in counterpart Chinese Application No. 201310698805.3.

(Continued)

*Primary Examiner* — Cheukfan Lee
(74) *Attorney, Agent, or Firm* — Holtz, Holtz & Volek PC

(57) ABSTRACT

A page-turning device turning a page of a book includes a turning unit and a blower. The turning unit holds the page at a departure position of the page of the book being opened and releases the holding of the page at a destination position of the page. The blower sends air above the page at the departure position to blow against the page at the destination position.

9 Claims, 12 Drawing Sheets

(56) References Cited

U.S. PATENT DOCUMENTS

| | | | |
|---|---|---|---|
| 5,612,791 A * | 3/1997 | Turner | G03B 27/625 |
| | | | 358/497 |
| 5,798,841 A | 8/1998 | Takahashi | |
| 5,921,540 A | 7/1999 | Acquaviva et al. | |
| 6,049,033 A * | 4/2000 | Dallas | 84/486 |
| 6,055,036 A | 4/2000 | Takahashi | |
| 6,281,990 B1 | 8/2001 | Takahashi | |
| 6,323,963 B1 | 11/2001 | Takahashi | |
| 6,574,014 B2 | 6/2003 | Mandel et al. | |
| 6,611,362 B2 | 8/2003 | Mandel et al. | |
| 6,830,453 B2 * | 12/2004 | Jung | 434/178 |
| 7,006,263 B2 | 2/2006 | Takahashi | |
| 7,259,312 B2 * | 8/2007 | Jakes | 84/486 |
| 7,557,965 B2 | 7/2009 | Taylor et al. | |
| 7,595,915 B2 | 9/2009 | Belkhir | |
| 8,646,193 B1 * | 2/2014 | Li et al. | 40/533 |
| 8,982,428 B2 * | 3/2015 | Hasegawa | 358/474 |
| 9,056,516 B2 | 6/2015 | Hasegawa | |
| 2004/0047009 A1 * | 3/2004 | Taylor et al. | 358/498 |
| 2005/0230592 A1 * | 10/2005 | Tillinghast et al. | 248/441.1 |
| 2008/0316551 A1 * | 12/2008 | Taylor et al. | 358/498 |
| 2014/0078561 A1 | 3/2014 | Hasegawa | |
| 2014/0168726 A1 | 6/2014 | Hasegawa | |
| 2014/0366412 A1 | 12/2014 | Hasegawa | |

OTHER PUBLICATIONS

Chinese Office Action (and English translation thereof) dated Dec. 2, 2015, issued in Chinese Application No. 201310698805.3.

* cited by examiner

PAGE-TURNING DEVICE AND DOCUMENT CAMERA SYSTEM

CROSS REFERENCE TO RELATED APPLICATION

This is a Divisional of U.S. application Ser. No. 14/094,295, filed Dec. 2, 2013, which is based upon and claims the benefit of priority under 35 USC 119 of Japanese Patent Application No. 2012-275300, filed Dec. 18, 2012, the entire contents of both of which are incorporated herein by reference.

BACKGROUND OF THE INVENTION

1. Field of the Invention

The present invention relates to a page-turning device and a document camera system.

2. Description of Related Art

Conventionally, as an automatic page-turning device to turn pages of a book or the like, there is known a page-turning device which sticks to each page of piled pages to turn pages, which is disclosed, for example, in Japanese Patent Application Laid-Open Publication No. H05-155179.

SUMMARY OF THE INVENTION

The sticking to the page is released at a destination position. After the release, there is a possibility that the page returns to the departure position due to resilience of the page itself.

Hence, objects of the present invention include turning pages more reliably by preventing the pages from returning to the departure position from the destination position.

In order to achieve at least one of the objects, according to a first aspect of the present invention, there is provided a page-turning device turning a page of a book including: a turning unit which holds the page at a departure position of the page of the book being opened and which releases the holding of the page at a destination position of the page; and a blower which sends air above the page at the departure position to blow against the page at the destination position.

In order to achieve at least one of the objects, according to a second aspect of the present invention, there is provided a document camera system including: the page-turning device; and an image pickup unit which images the page of the book.

BRIEF DESCRIPTION OF THE DRAWINGS

The present invention will become more fully understood from the detailed description given hereinafter and the appended drawings, which are given byway of illustration only and thus are not intended as a definition of the limits of the present invention, wherein.

DETAILED DESCRIPTION OF THE PREFERRED EMBODIMENT

Hereinafter, an embodiment of the present invention will be described with reference to the drawings. Though various technical limitations which are preferable to carry out the present invention are added to the after-described embodiment, the scope of the invention is not limited to the following embodiment and the illustrated examples.

Figure 1:
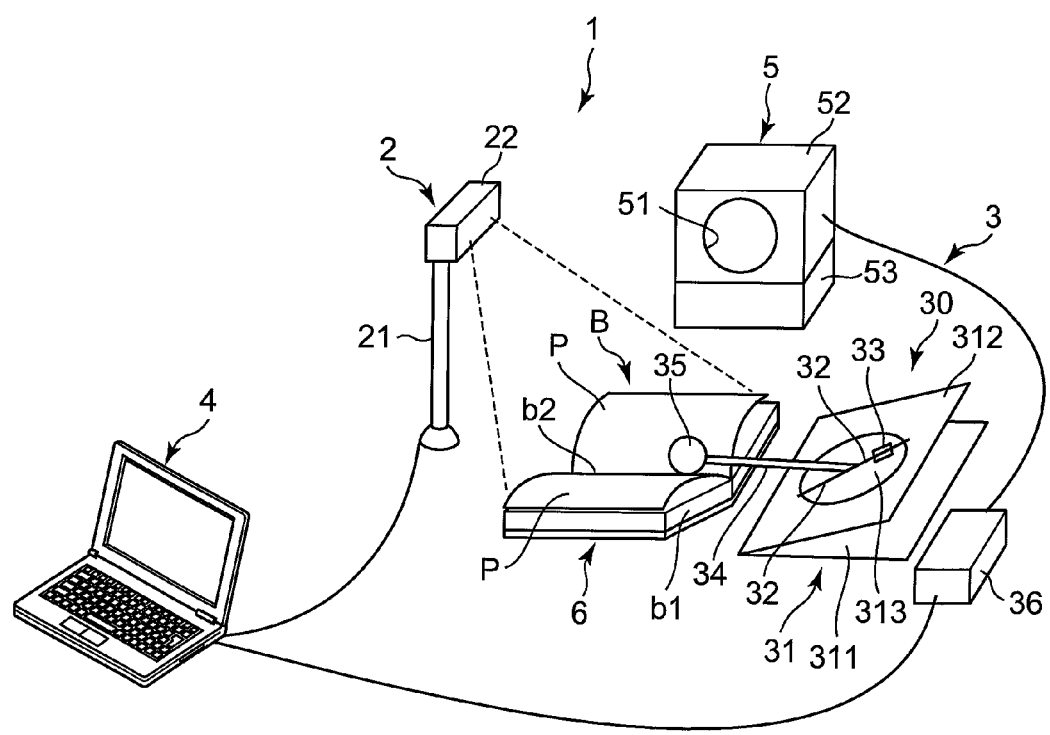
FIG. 1 is a perspective view schematically showing the configuration of a document camera system according to an embodiment of the present invention.
Figure 2A:
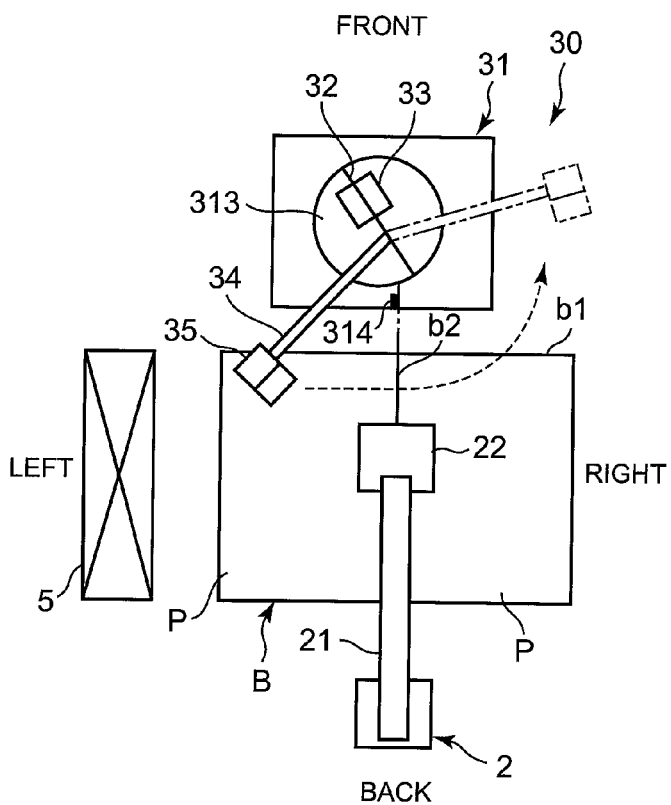
FIG. 2A is a top view showing the configuration of the essential part of the document camera system in FIG. 1.
Figure 2B:
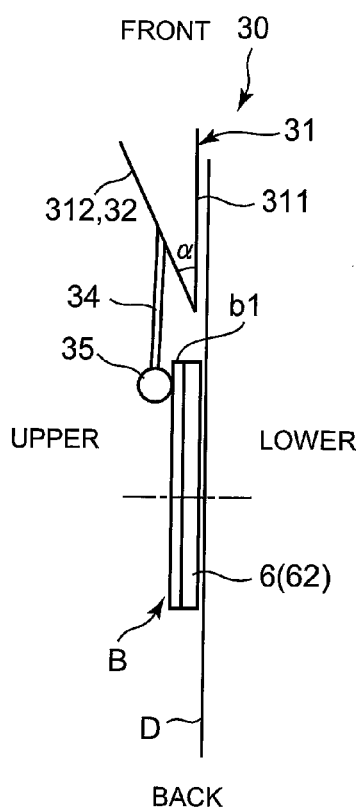
FIG. 2B is a side view showing the configuration of the essential part of the document camera system in FIG. 1.
Figure 3:
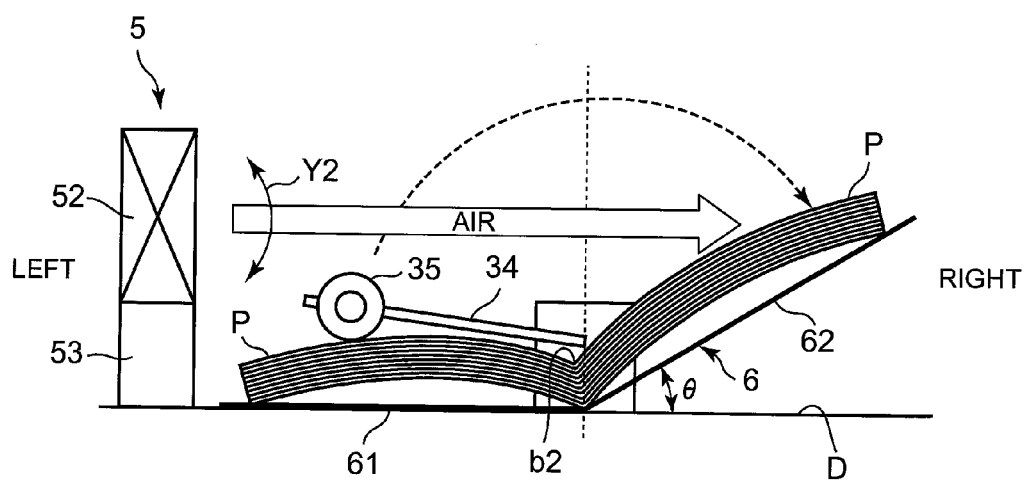
FIG. 3 is an elevation view showing a route of a sticking part provided on the top end of an arm part according to the embodiment.

FIG. 1 is a perspective view schematically showing the configuration of a document camera system according to an embodiment of the present invention. FIG. 2A and FIG. 2B illustrate the configuration of the essential part of the document camera system, wherein FIG. 2A is a top view, and FIG. 2B is a side view. FIG. 3 is an elevation view showing the essential part of the document camera system. In the explanation hereinafter, pages P of a book B are turned from left to right.

As shown in FIG. 1 to FIG. 3, a document camera system 1 includes: a document camera 2 as an image pickup unit which picks up images of the pages P of the book B; a page-turning device 3 which turns the pages P of the book B; and a personal computer 4 connected to the document camera 2 and the page-turning device 3 such that the computer 4 can communicate with the document camera 2 and the page-turning device 3.

The document camera 2 includes a stand part 21 and a camera 22 attached to the upper end of the stand part 21. The stand part 21 is inclinable in the front-back direction and the left-right direction, and extensible in the up-down direction, so that a positional relationship of the book B and the camera 22 can be adjusted. A lens of the camera 22 faces downward such that the book B comes within an angle of view. A position-adjustment mechanism is disposed at the joining portion of the camera 22 and the stand part 21, so that the facing direction of the lens of the camera 22 can be adjusted.

The page-turning device 3 includes: a support base 6 which supports the book B being opened; a turning unit 30 which holds the page P at a departure position of the page P of the book B and which releases the holding of the page P at a destination position of the page P; a blower 5 which sends air above the page P at the departure position to blow against the page P at the destination position; and a control unit 36 which controls these parts and the like.

As shown in FIG. 3, the support base 6 includes a couple of support plates 61, 62. The support base 6 can be folded up by using a hinge, which is not shown in drawings. When the pages P of the book B are turned from left to right as shown in FIG. 3, a first support plate 61 of the support plates 61, 62 which is disposed on the left is laid on the desk D, and a second support plate 62 which is disposed on the right is placed on the desk D such that the second support plate 62 is inclined at a predetermined angle as if the second support plate 62 approaches the first support plate 61. The page P at the departure position is placed on the first support plate 61, while the page P at the destination position is placed on the second support plate 62.

When the pages P of the book B are turned from right to left, the second support plate 62 which is disposed on the right is laid on the desk D, and the first support plate 61 which is disposed on the left is placed on the desk D such that the first support plate 61 is inclined at a predetermined angle as if the first support plate 61 approaches the second support plate 62. The page P at the departure position is placed on the second support plate 62, while the page P at the destination position is placed on the first support plate 61.

Thereby, the support base 6 supports the book B such that a destination position inclined angle between the page P at the destination position and a horizontal plane is larger than a departure position inclined angle between the page P at the departure position and the horizontal plane. Since the support base 6 can be folded up by using a hinge between the support plates 61, 62, an angle between the support plates 61, 62 is adjustable. Therefore the destination position inclined angle $\theta$ between the page P at the destination position and the horizontal plane is adjustable. The destination position inclined angle $\theta$ is preferably adjusted to 30 to 45 degrees.

The turning unit 30 includes: a base 31; a first drive unit (drive unit) 33, such as a motor, disposed on the base 31 and having a drive shaft 32; an arm part 34 which swings around the drive shaft 32; and a sticking part 35 attached to the top end of the arm part 34, the sticking part 35 sticking to or separating from a page P of the book B.

The base 31 is disposed on a desk D such that one side of the base 31 is parallel to the upper side b1 of the book B opened on the support base 6. In the explanation hereinafter, "back" is defined as a side where the book B is disposed, i.e. the book B side, and "front" is defined as a side where the base 31 is disposed, i.e. the base 31 side. The seam b2 of the book B is along the front-back direction. The base 31 includes a main base 311 and a sub base 312 which is superposed on the main base 311 and can adjust an angle $\alpha$ between the main base 311 and the sub base 312. On the back end (the end on the book B side) of the sub base 312, a hinge (not shown) is disposed. This hinge makes the angle $\alpha$ between the sub base 312 and the main base 311 adjustable. The sub base 312 is provided with a rotating plate 313 which is rotatable and supports the first drive unit 33. The drive shaft 32 of the first drive unit 33 is disposed parallel to the upper surface of the rotating plate 313.

When the pages P of the book B are turned from left to right, the angle of the rotating plate 313 is determined such that the back end (the end on the book B side) of the drive shaft 32 turns to right-hand side with respect to the seam b2 of the pages P and the front end (the end on a side opposite to the book B side) of the drive shaft 32 as the base end turns to left-hand side with respect to the seam b2 of the pages P. On the other hand, when the pages P of the book B are turned from right to left, the angle of the rotating plate 313 is determined such that the back end (the end on the book B side) of the drive shaft 32 turns to left-hand side with respect to the seam b2 of the pages P and the front end (the end on the side opposite to the book B side) of the drive shaft 32 turns to right-hand side with respect to the seam b2 of the pages P.

Whichever the turning direction is, the drive shaft 32 is inclined such that the base end of the drive shaft 32 is on a side where a departure position of the pages P exists (departure position side) with respect to the seam b2 of the book B and also inclined at the angle $\alpha$ with respect to a plane on which the book B is put (horizontal plane).

Also, a mark 314 for locating is formed at the back end (the end on the book B side) of the sub base 312. It is preferable to locate the base 31 such that this mark 314 is on the extension of the seam b2.

The arm part 34 is inclined with respect to the drive shaft 32 toward the book B side. As the drive shaft 32 rotates, the arm part 34 goes to and fro (shuttle operation) between the departure position and a destination position of the pages P as if the arm part 34 draws a circular arc around the drive shaft 32. That is to say, the drive shaft 32 is a symmetry axis of swing of the arm part 34. In the explanation hereinafter, a movement from the departure position to the destination position of the pages P is referred to as an outward movement (a motion of going), and a movement from the destination position to the departure position is referred to as a homeward movement (a motion of return).

FIG. 3 is an elevation view (viewed in a direction along an axis of the seam b2 of the pages P or viewed from a plane side, the normal line of which is parallel to the seam b2) showing a route of the sticking part 35 provided on the top end of the arm part 34. As shown in FIG. 3, in the outward movement, the sticking part 35 on the top end of the arm part 34 moves from a position which contacts the departure position of the pages P to the destination position of the pages P as if the sticking part 35 draws a circular arc over the pages P.

Figure 4A:
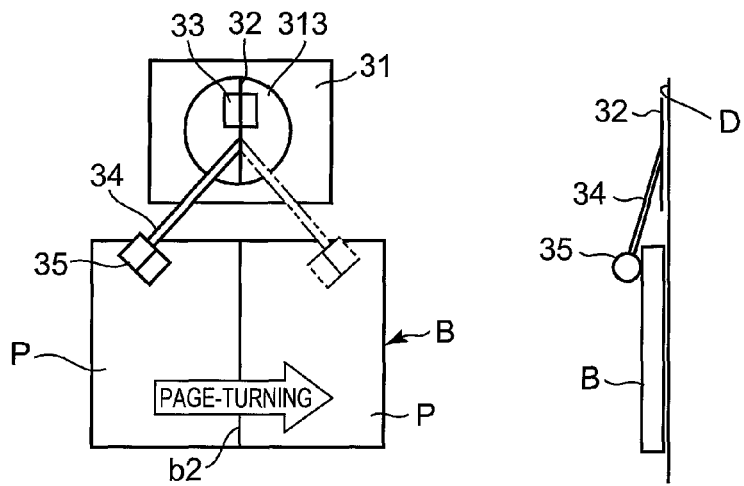
FIG. 4A, FIG. 4B and FIG. 4C schematically illustrate how inclination of a drive shaft of a first drive unit according to the embodiment affects a page-turning operation.
Figure 4B:
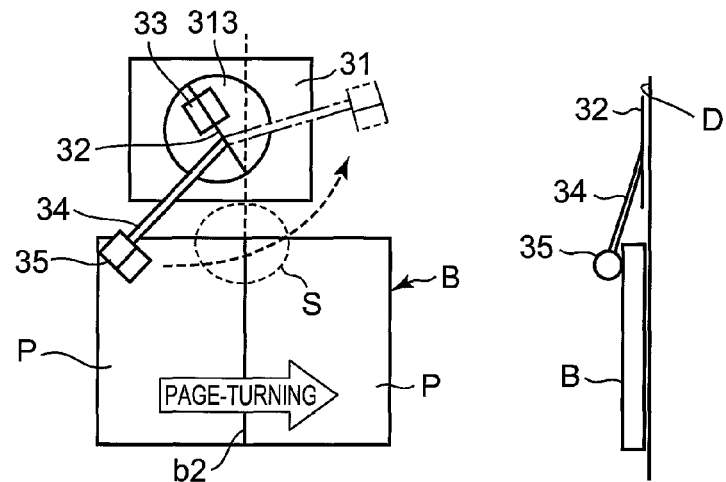
Figure 4C:
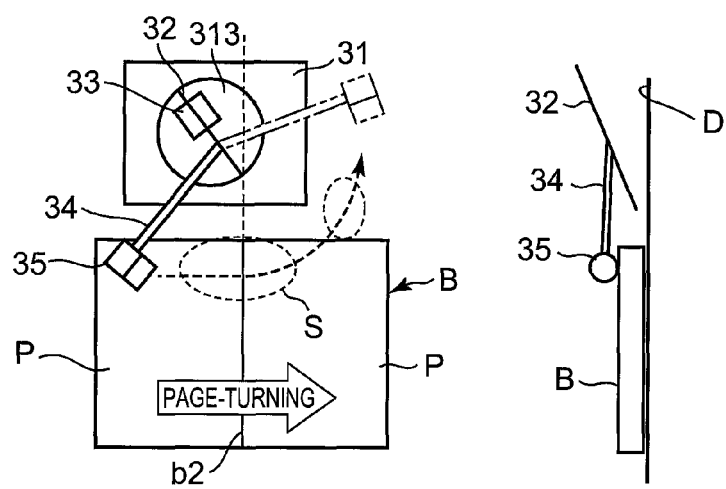

FIG. 4A, FIG. 4B and FIG. 4C schematically illustrate how the inclination of the drive shaft 32 affects the page-turning operation of the pages P. FIG. 4A, FIG. 4B and FIG. 4C show the book B placed not on the support base 6 but directly on the desk D so that the configuration can be easily understood. FIG. 4A illustrates a case where the drive shaft 32 is horizontally disposed on the extension of the seam b2. In this case, since the sticking part 35 moves along a route the symmetry axis of which corresponds to the seam b2, the sticking part 35 keeps in contact with the right-side page P at the destination position of the pages P without being able to separate from the page P.

FIG. 4B illustrates a case where the drive shaft 32 is horizontal and inclined such that the back end of the drive shaft 32 turns to right-hand side with respect to the seam b2 of the pages P and the front end of the drive shaft 32 as the base end turns to left-hand side with respect to the seam b2 of the pages P. In this case, after the sticking part 35 sticks to a page P at the departure position, the arm part 34 rotates around the drive shaft 32, and at the end point of the outward movement, the sticking part 35 separates from the book B forward. Therefore, the sticking part 35 can easily separate from the sticking page P.

In this case, however, the pages P cannot always be turned smoothly. One possible cause is that the distance between the book B and the sticking part 35 becomes long in the first phase to the middle phase (the ellipse S) of the page-turning operation.

FIG. 4C illustrates a case where the drive shaft 32 is inclined with respect to the seam b2 of the book B and is also inclined with respect to the horizontal plane, i.e. a case of the drive shaft 32 according to the embodiment. In this case, the distance between the book B and the sticking part 35 in the first phase to the middle phase (the ellipse S) of the page-turning is shorter than that in the case shown in FIG. 4B.

Figure 5A:
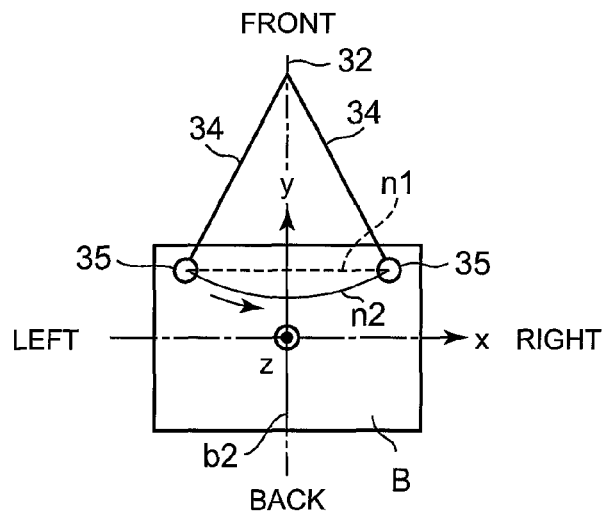
FIG. 5A, FIG. 5B and FIG. 5C are respectively a top view, a side view and an elevation view, schematically showing difference of routes of the sticking part between a case where the drive shaft of the first drive unit is horizontal and a case where the drive shaft is inclined with respect to the vertical line standing perpendicular to the seam.
Figure 5B:
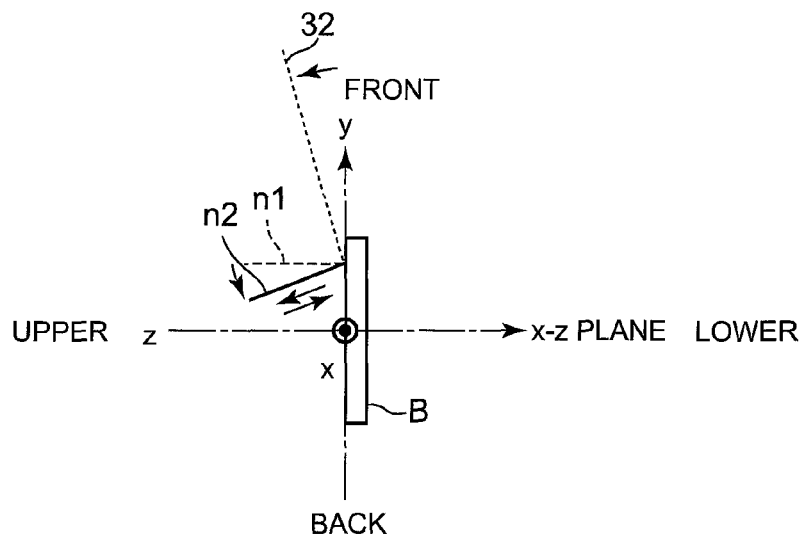
Figure 5C:
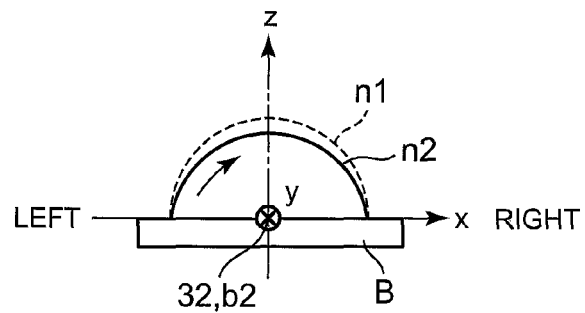

To be more specific, FIG. 5A, FIG. 5B and FIG. 5C schematically illustrate difference of routes of the sticking part 35 between a case where the drive shaft 32 is horizontal and a case where the drive shaft 32 is inclined with respect to the horizontal plane, wherein FIG. 5A is a top view, FIG. 5B is a side view, and FIG. 5C is an elevation view. In FIG. 5A, FIG. 5B and FIG. 5C, the left-right direction, the up-down direction and the vertical direction of the book B are respectively defined as an x direction, a y direction and a z direction. In FIG. 5A, FIG. 5B and FIG. 5C, the drive shaft 32 aligns with the seam b2 of the book B in order to clarify the point that the drive shaft 32 of the embodiment is inclined with respect to the horizontal plane. As shown in FIG. 5A, FIG. 5B and FIG. 5C, in the case where the drive shaft 32 is horizontal (dot lines in the figures), the locus n1 of the sticking part 35 is a straight line along the left-right direction in the top view (FIG. 5A), a straight line along the vertical direction in the side view (FIG. 5B) and a semicircle in the elevation view (FIG. 5C). On the other hand, in the case where the drive shaft 32 is inclined with respect to the horizontal plane (solid lines in the figures), the locus n2 of the sticking part 35 is a circular arc being convex backward in the top view (FIG. 5A), a straight line with its upper end being inclined backward in the side view (FIG. 5B) and a deformed semicircle in the elevation view (FIG. 5C). The locus n2 in FIG. 5B shows the locus plane of the driven sticking part 35 viewed from the side. It shows that the locus n2 is inclined with respect to a plane (x-z plane) including the left-right direction of the book B and a normal line of the book B.

As is known from FIG. 5C, the distance from the sticking part 35 to the seam b2 when the sticking part 35 passes over the seam b2 is shorter than the distance from the sticking part 35 to the seam b2 when the sticking part 35 sticks to a page P at the departure position. That is to say, the locus n2 can make the distance from the book B to the sticking part 35 when the sticking part 35 passes over the seam b2 shorter than the locus n1.

Thus, according to the embodiment shown in FIG. 4C, in the second phase of the page-turning, the distance between the book B (the seam b2) and the sticking part 35 becomes long, so that the sticking part 35 can easily separate from the sticking page P. Also, in the first phase to the middle phase (the ellipse S) of the page-turning operation, the distance between the book B (the seam b2) and the sticking part 35 becomes short, so that a page P can be slackened appropriately. Therefore, the pages P can be reliably turned.

In the homeward movement, the moving direction is opposite to that in the outward movement, and the sticking part 35 takes the same route as that of the outward movement, moves keeping a distance from the pages P and, in the end, sticks to another page P at the departure position of the pages P.

Repeating this shuttle operation progresses the page-turning operation of the pages P.

In the present embodiment, the drive shaft 32 is inclined with respect to the seam b2 of the opened book B and is also inclined with respect to the horizontal plane as shown in FIG. 4C as an example. It is needless to say that if the drive shaft 32 is inclined with respect to either the seam b2 or the horizontal plane, these cases have their respective effects.

If the drive shaft 32 is inclined only with respect to the horizontal plane, as described later, a second drive unit 37 is driven or the sticking part 35 is configured in such a way as to stay at a higher position on the right than that on the left so that the sticking part 35 can easily separate from a page P.

Figure 6:
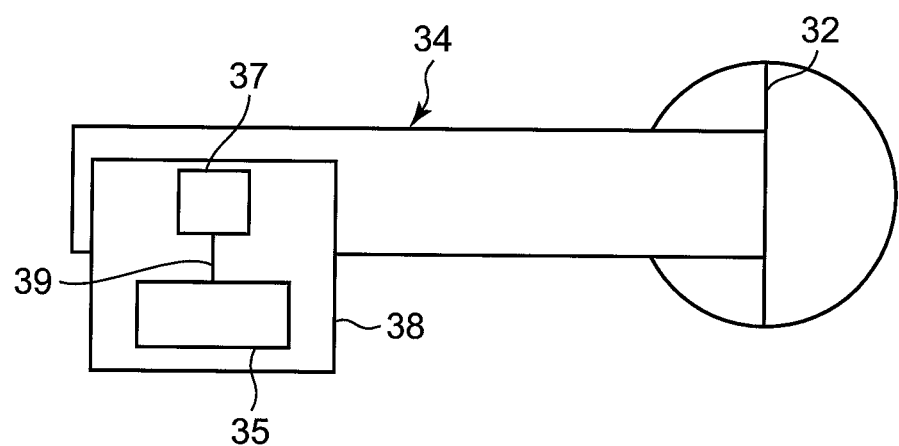
FIG. 6 is a schematic view schematically showing the configuration of the arm part according to the embodiment.

Next, specific configurations of the arm part 34 and the sticking part 35 will be explained. FIG. 6 is a schematic diagram schematically showing the configuration of the arm part 34. The arm part 34 is a plate component the base end of which is attached to the drive shaft 32 as shown in FIG. 6. The sticking part 35 is attached to the top end of the arm part 34 via the second drive unit 37 such as a motor.

The second drive unit 37 is disposed such that a drive shaft 39 of the second drive unit 37 is along a direction perpendicular to the longitudinal direction of the arm part 34. The sticking part 35 is removably attached to the drive shaft 39, and the sticking part 35 rotates as the drive shaft 39 rotates.

Figure 7:
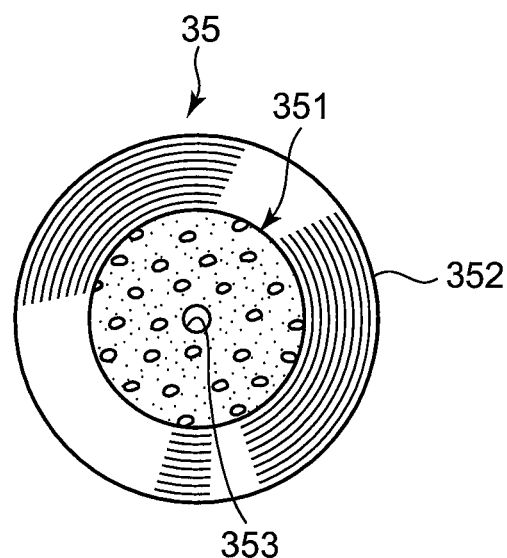
FIG. 7 is an elevation view schematically showing the configuration of the sticking part according to the embodiment.

FIG. 7 is an elevation view schematically showing the configuration of the sticking part 35. As shown in FIG. 7, the sticking part 35 includes a columnar rotating roller 351 and an adhesive component 352 wound around the rotating roller 351.

There has been desire to improve working efficiency in replacement of the sticking parts 35 with respect to the drive shaft 39 of the second drive unit 37. Hence, the rotating roller 351 is made of an elastic body such as a sponge, and a fit hole 353 into which the drive shaft 39 is fitted is formed at the center of the rotating roller 351. Other than the sponge, examples of the elastic body include rubber and foam. The inner diameter of the fit hole 353 is formed to be smaller than the outer diameter of the drive shaft 39. By pushing the drive shaft 39 into the fit hole 353, the rotating roller 351 contracts, and the drive shaft 39 fits in the fit hole 353. Consequently, at the replacement, the rotating roller 351 can be removed from the drive shaft 39 only by pulling the rotating roller 351 to be detached from the drive shaft 39. Thus, since the rotating roller 351 is elastic, the sticking part 35 can be easily put on and removed from the drive shaft 39, and accordingly the sticking part 35 can be easily replaced with another.

Figure 8:
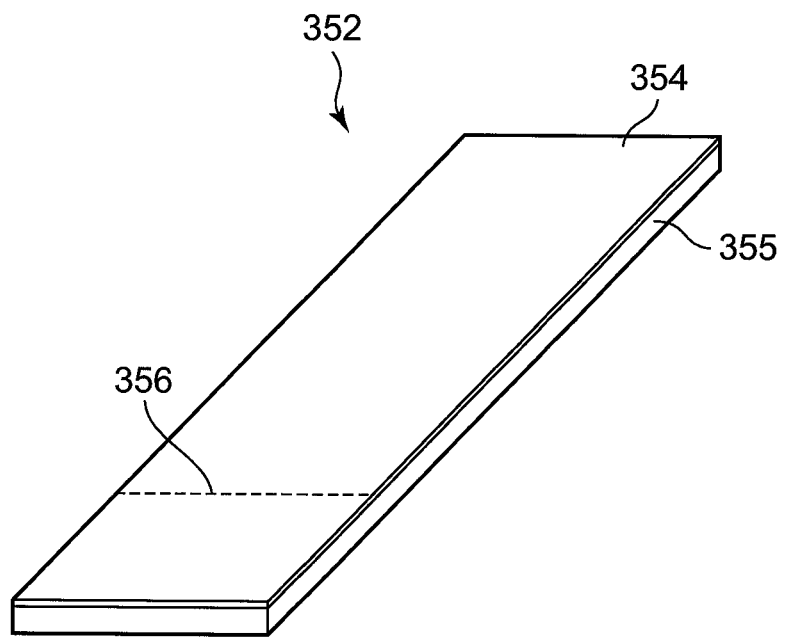
FIG. 8 is a perspective view schematically showing the structure of an adhesive component according to the embodiment.

FIG. 8 is a perspective view schematically showing the configuration of the adhesive component 352. As shown in FIG. 8, the adhesive component 352 is sheet-shaped and has, for example, a double-sided adhesive structure like a double-sided tape. The adhesive component 352 has a two-layer structure of a weak adhesive layer 354 and a strong adhesive layer 355. The weak adhesive layer 354 is provided on a side which sticks to the book B (surface side). The weak adhesive layer 354 has: weak adhesive power so that pieces of the weak adhesive layer 354 do not remain after the adhesive component 352 is removed; and a property that the weak adhesive layer 354 can be used multiple times. On the other hand, the strong adhesive layer 355 is provided on the opposite side. The strong adhesive layer 355 has adhesive power stronger than the weak adhesive layer 354 so that the strong adhesive layer 355 maintains a state of being wound around the rotating roller 351. Perforations 356 are formed at predetermined length intervals on the adhesive component 352.

Figure 9A:
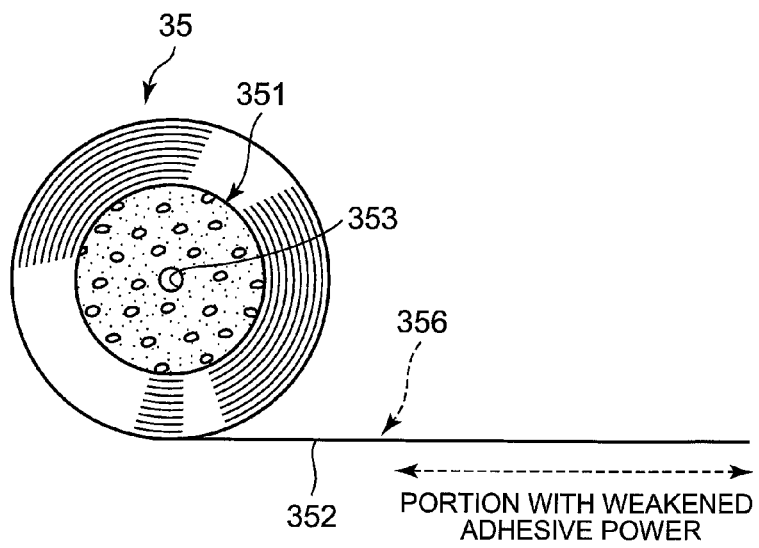
FIG. 9A and FIG. 9B illustrate a process of removing the adhesive component when the adhesive power has weakened.
Figure 9B:
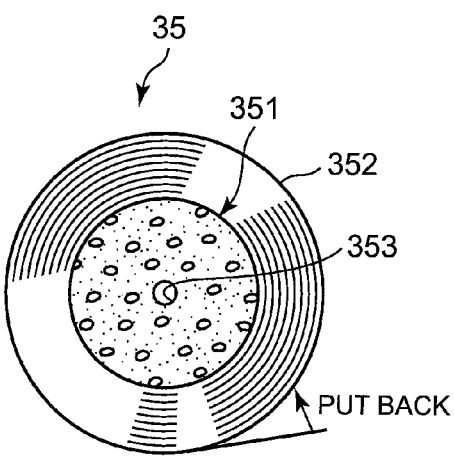

FIG. 9A and FIG. 9B illustrate a process of removing the adhesive component 352 when the adhesive power has weakened. When a user feels that the adhesive power has weakened, the user removes the most outer surface of the adhesive component 352 by one round to expose a new portion of the weak adhesive layer 354 of the adhesive component 352 as shown in FIG. 9A. Then, the portion, the adhesive power of which has weakened, can be cut along the perforation 356. At the time of cutting, if a portion thereof temporarily peels off as shown in FIG. 9B, the user puts the portion back. Thus, a new portion of the weak adhesive layer 354 is exposed, so that the page-turning operation can be appropriately resumed.

As shown in FIG. 1 to FIG. 3, the blower 5 is disposed upstream from the departure position of the book B. For example, when the page P of the book B is turned from left to right, the blower 5 is disposed on the left side of the page P which is placed at the departure position of the book B. When the page P of the book B is turned from right to left, the blower 5 is disposed on the right side of the page P which is placed at the departure position of the book B. Therefore the blower 5 is disposed outside the angle of view of the camera 22. The blower 5 includes a blower body 52 and a blower base 53 which supports the blower body 52. The blower body 52 includes an air outlet 51 which sends out air.

Figure 10:
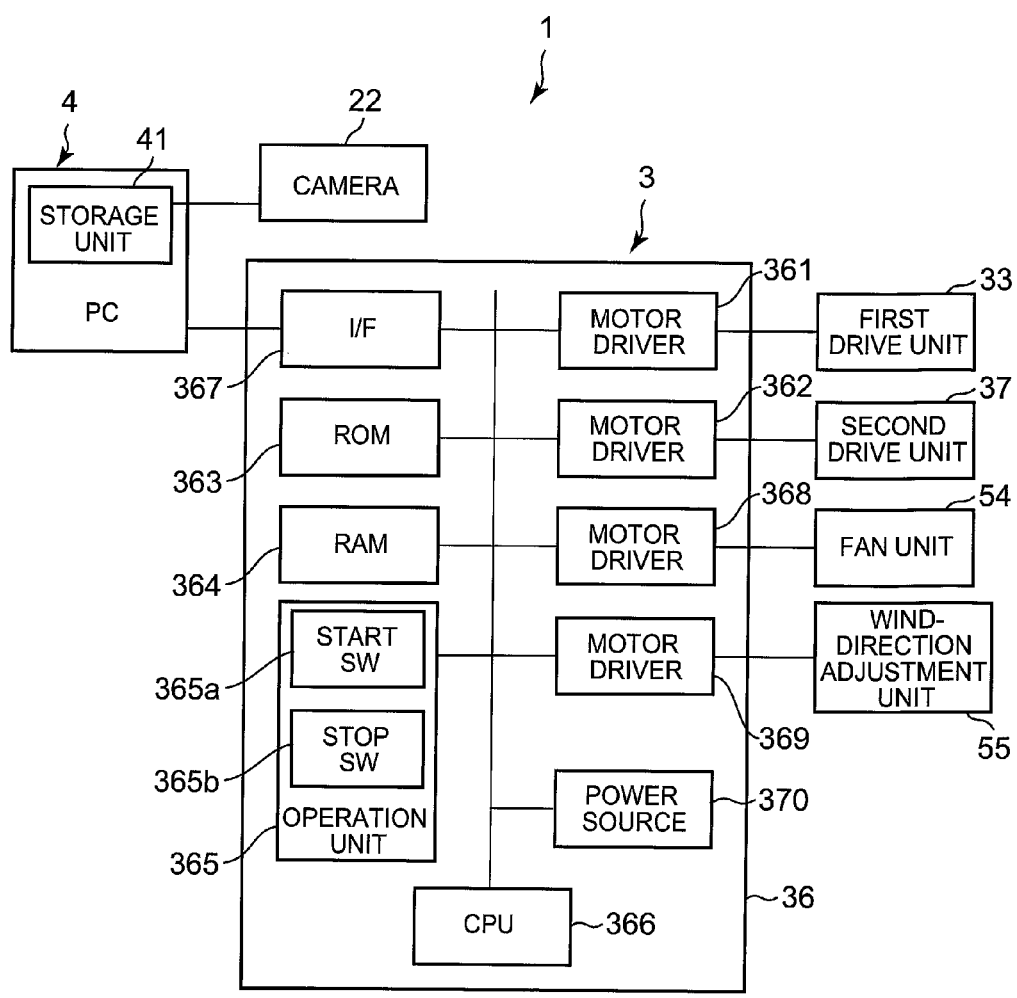
FIG. 10 is a block diagram showing the main control configuration of the document camera system according to the embodiment.

The blower body 52 is provided with a fan unit 54 (see FIG. 10) and a wind-direction control unit 55 (see FIG. 10). The fan unit 54 sends air from the air outlet 51. The wind-direction control unit 55 changes a moving direction of air (a wind direction) sent from the fan unit 54. The wind-direction control unit 55 changes the wind direction such that the wind blows upward or downward (the direction of the arrow Y2 in FIG. 3) from the air outlet 51.

The blower base 53 supports the blower body 52 at a predetermined height. This blower base 53 is configured such that the air outlet 51 is disposed higher than the page P at the departure position. Therefore a wind which blows from the air outlet 51 passes above the page P at the departure position and blows against the page P at the destination position. The page P at the departure position is not much affected by the wind, while the page P at the destination position is much affected by the wind.

Next, the main control configuration of a document camera system 1 according to the embodiment will be explained. FIG. 10 is a block diagram showing the main control configuration of the document camera system 1. As shown in FIG. 10, the control unit 36 of the page-turning device 3 includes: a motor driver 361 which drives the first drive unit 33; a motor driver 362 which drives the second drive unit 37; a motor driver 368 which drives the fan unit 54; a motor driver 369 which drives the wind-direction adjustment unit 55; a ROM 363 where a variety of programs are stored; a RAM 364 where the programs stored in the ROM 363 are opened when the programs are executed; an operation unit 365 where a variety of instructions are inputted; a CPU 366 which controls the motor drivers 361 and 362 by opening and executing the programs, which are stored in the ROM 363, in the RAM 364 on the basis of the instructions from the operation unit 365; an I/F 367 to which the computer 4 is connected; and a power source 370.

The operation unit 365 includes a start switch 365a for starting page-turning processing and a stop switch 365b for stopping the page-turning processing. The CPU 366 counts turned pages as a value N from the time when the start switch 365a is operated to the time when the stop switch 365b is operated. The value N is stored in the RAM 364. Thus the control unit 36 functions as a page-turn-amount detector of the present invention which detects the amount of the pages P turned by the turning unit 30.

Figure 11:
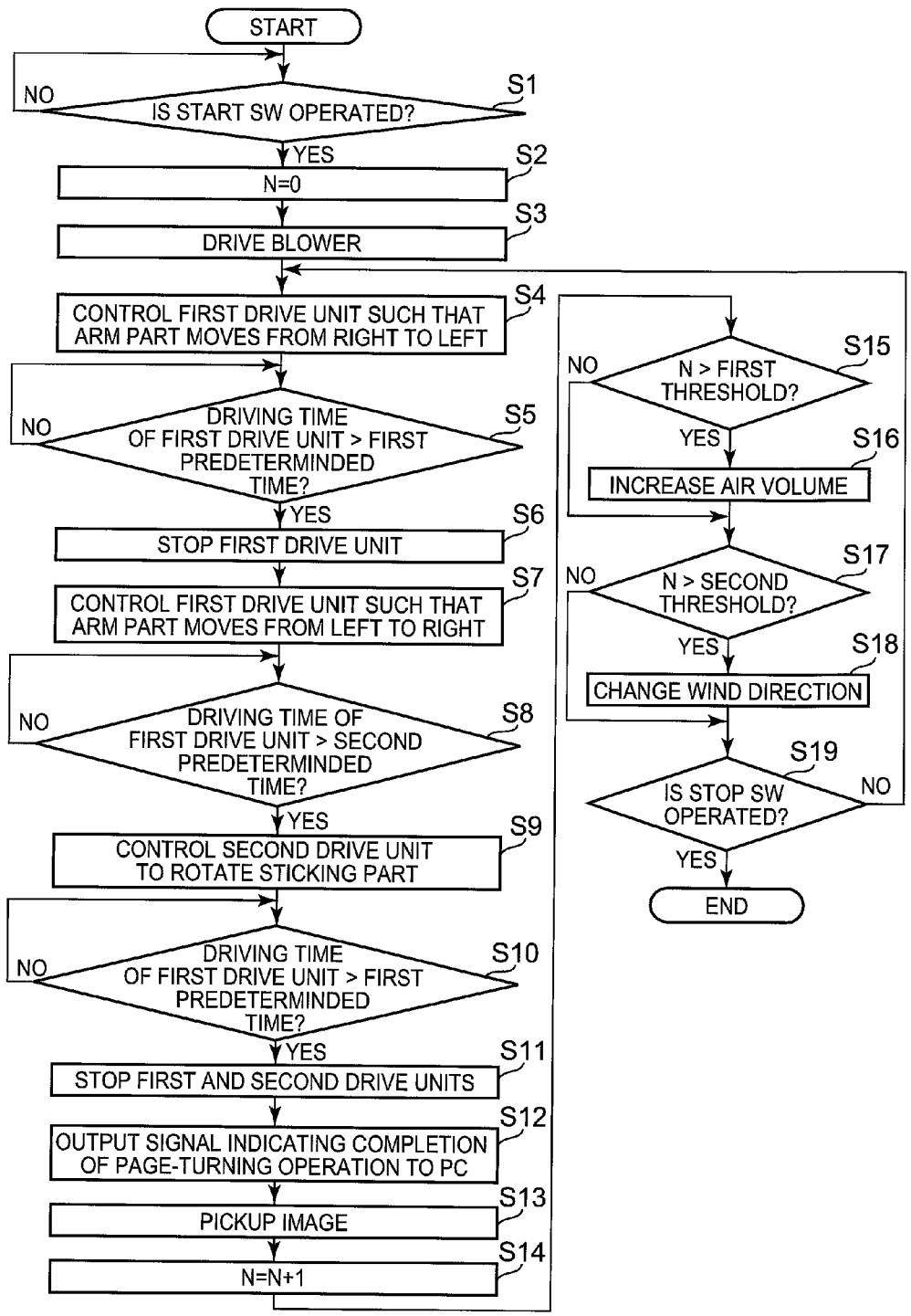
FIG. 11 is a flowchart of page-turning processing by the page-turning device of the embodiment.

The page-turning processing by the document camera system 1 will be explained hereinafter. FIG. 11 is a flowchart of the page-turning processing.

First, preparation before execution of the page-turning processing will be explained. In the page-turning device 3, the position of the arm part 34 is adjusted such that the sticking part 35 is disposed at the starting point (the end point of the homeward movement) in advance. At the time, a user checks the adhesive power of the adhesive component 352. If the adhesive power is weak, the user removes the weak portion to expose a new portion of the adhesive component 352. Then, the user opens the book B such that one page (one double-page spread) P before a page (a double-page spread) P from which the user would like to start image pickup is exposed and moves the sticking part 35 to the end point of the outward movement (the start point of the homeward movement). When the power source of the page-turning device 3 is turned on, the CPU 366 opens in the RAM 364 a program for the page-turning processing stored in the ROM 363 to execute the program.

As shown in FIG. 11, at Step S1, the CPU 366 determines whether or not the start switch 365a is operated. When determining that the start switch 365a is not operated, the CPU 366 keeps the state as it is. When determining that the start switch 365a is operated, the CPU 366 shifts the processing to Step S2.

At Step S2, the CPU 366 resets the value N, which is stored in the RAM 364, at zero.

At Step S3, the CPU 366 drives the fan unit 54 to carry out blowing with the blower 5. At this time, an air volume of the fan unit 54 is set at an initial air volume. In the beginning of turning pages P, a large number of pages P exist at the departure position, so the thickness of the pages P as a whole is large. Therefore the wind-direction adjustment unit is controlled such that a wind from the blower 5 blows in a direction slightly upward from a horizontal plane.

At Step S4, the CPU 366 controls the first drive unit 33 such that the arm part 34 moves from right to left (homeward movement).

At Step S5, the CPU 366 determines whether or not a driving time of the first drive unit 33 exceeds a first predetermined time. When determining that the driving time does not exceed the first predetermined time, the CPU 366 keeps driving the first drive unit 33. When determining that the driving time exceeds the first predetermined time, the CPU 366 shifts the processing to Step S6. The first predetermined time is set at a time length enough for the arm part 34 to move from the start point to the end point of the homeward movement.

At Step S6, the CPU 366 stops the first drive unit 33. Thereby, the sticking part 35 sticks to a page P on the left with rotation of the sticking part 35 stopped.

At Step S7, the CPU 366 controls the first drive unit 33 such that the arm part 34 moves from left to right (outward movement).

At Step S8, the CPU 366 determines whether or not a driving time of the first drive unit 33 exceeds a second predetermined time. When determining that the driving time does not exceed the second predetermined time, the CPU 366 keeps driving the first drive unit 33. When determining that the driving time exceeds the second predetermined time, the CPU shifts the processing to Step S9. The second predetermined time is set at a time (time length) shorter than the first predetermined time. In particular, it is preferable that the second predetermined time period is set from a time for the arm part 34 to move from the start point to around the middle point of the outward movement to a time for the arm part 34 to move from the start point to almost the end point of the outward movement.

Figure 12:
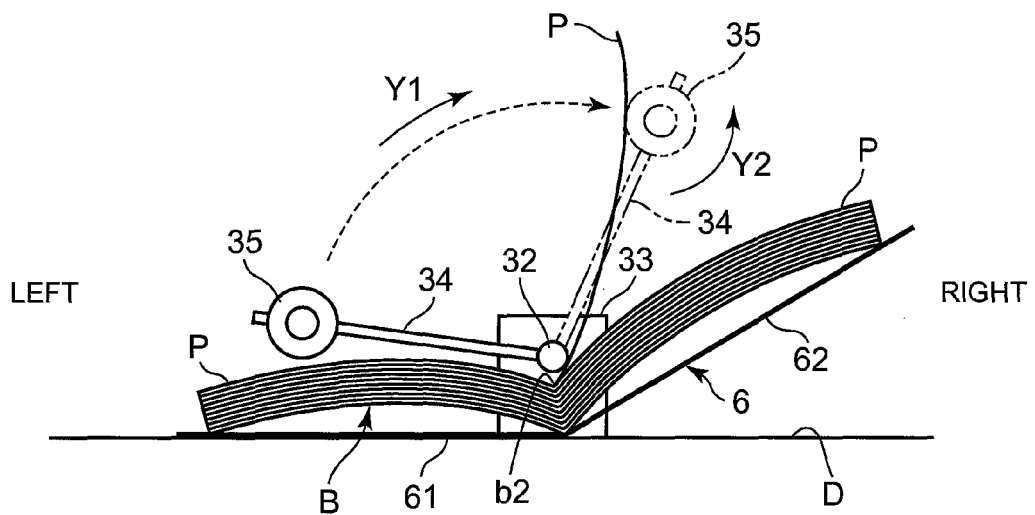
FIG. 12 is an elevation view showing a route and a rotating direction of the sticking part in an outward movement of the arm part according to the embodiment.

At Step S9, the CPU 366 controls the second drive unit 37 to rotate the sticking part 35 while continuing driving of the first drive unit 33. This rotation changes the adhesive power of the sticking part 35 when the sticking part 35 separates from a page P, so that the sticking part 35 can reliably separate from the page P. As shown in FIG. 12, the arm part 34 rotates clockwise (arrow Y1) in the outward movement. In order to improve the separation performance, it is preferable that the second drive unit 37 rotate the sticking part 35 in a direction opposite to the swing direction of the arm part 34, i.e. counterclockwise.

At Step S10, the CPU 366 determines whether or not the driving time of the first drive unit 33 exceeds the first predetermined time. When determining that the driving time does not exceed the first predetermined time, the CPU 366 keeps driving the first drive unit 33 and the second drive unit 37. When determining that the driving time exceeds the first predetermined time, the CPU 366 shifts the processing to Step S11.

At Step S11, the CPU 366 stops the first drive unit 33 and the second drive unit 37. The sticking page P is separated from the sticking part 35 while the second drive unit 37 rotates. Thereby, the sticking part 35 is located at a position apart from the pages P of the destination position with no page P sticking thereto. The sticking part 35 and the arm part 34 at this position are outside the angle of view of the camera 22. Thus the whole turning unit 30 is outside the angle of view of the camera 22. (See FIG. 2A.)

Figure 13:
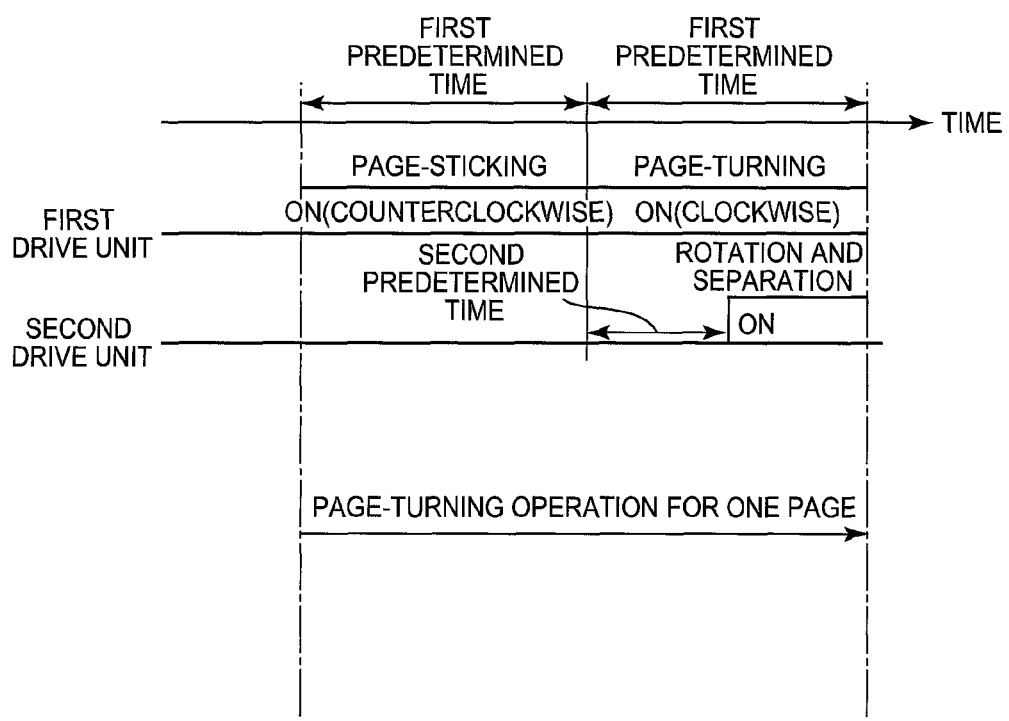
FIG. 13 is a timing chart showing drive timings of the first drive unit and the second drive unit in the page-turning operation for one page according to the embodiment.

FIG. 13 illustrates drive timings of the first drive unit 33 and the second drive unit 37 in the page-turning operation for one page.

In the embodiment, a drive end timing when the second drive unit 37 stops coincides with a drive end timing when the first drive unit 33 stops. However, the drive end timing when the second drive unit 37 stops may be earlier than the drive end timing when the first drive unit 33 stops.

At Step S12, the CPU 366 outputs a signal which indicates completion of the page-turning processing to the computer 4.

At Step S13, the computer 4 controls the camera 22 on the basis of the inputted signal which indicates completion of the page-turning operation so that the pages P opened at present (spread state) are imaged (image pickup). At the time, since the turning unit 30 and the blower 5 are outside the angle of view of the camera 22, only the pages P opened at present are imaged. Picked-up image data generated by the camera 22 are numbered one by one (each imaging) and stored in a storage unit 41 of the computer 4.

At Step S13, both of the pages P in a spread state at present may be imaged. However, preferably, imaging is executed as follows. First, only the pages P at the departure position which are not inclined, for example, odd pages are imaged. Next, even pages P are placed at the departure position, and only even pages are imaged. Then the images are arranged alternately so that pages line up in numerical order, and are integrated as a set of images obtained by scanning all pages.

At Step S14, the CPU 366 adds one to the value N and stores the result in the RAM 364.

At Step S15, the CPU 366 determines whether or not the value N exceeds a first threshold. When determining that the value N exceeds the first threshold, the CPU 366 shifts the processing to Step S16. When determining that the value N does not exceed the first threshold, the CPU 366 shifts the processing to Step S17. When many pages P are piled up at the destination position, the pages P are likely to return to the departure position. Therefore the first threshold is set at such an amount of turned pages that a wind of the initial air volume can reliably push the pages P against the destination position.

At Step S16, the CPU 366 controls the fan unit 54 to make the air volume larger than the initial air volume.

At Step S17, the CPU 366 determines whether or not the value N exceeds a second threshold. When determining that the value N exceeds the second threshold, the CPU 366 shifts the processing to Step S18. When determining that the value N does not exceed the second threshold, the CPU 366 shifts the processing to Step S19. As many pages P are turned, the height of the pages P at the departure position as a whole gets lower, and the lower edge of the last turned page P at the destination position gets lower. Therefore the second threshold is set at such an amount of turned pages that a wind in the initial wind direction can reliably push the pages P against the destination position.

At Step S18, the CPU 366 controls the wind-direction adjustment unit 55 to make the wind direction downward as compared with the initial wind direction.

At Step S19, the CPU 366 determines whether or not the stop switch 365b is operated. When determining that the stop switch 365b is not operated, the CPU 366 shifts the processing to Step S2. When determining that the stop switch 365b is operated, the CPU 366 ends the page-turning processing. In this way, the page-turning operation and the image pickup operation are alternately carried out, and image pickup of desired pages P is completed.

As described above, according to the embodiment, the blower 5 sends air above the page P at the departure position to blow against the page P at the destination position. Therefore the page P at the departure position is not affected by a wind, while the page P at the destination position is pushed by the wind. Thus the page P is prevented from returning to the departure position from the destination position, and is reliably turned.

Further, the air outlet 51 of the blower 5 is placed higher than the page P at the departure position. Thereby, a wind blowing from the air outlet 51 can reliably pass above the page P at the departure position. Thus the page P at the departure position can be reliably prevented from being affected by the wind.

Further, due to the support base 6, the destination position inclined angle between the page P at the destination position and a horizontal plane is larger than the departure position inclined angle between the page P at the departure position and the horizontal plane. Thereby, a wind which has passed above the page P at the departure position can easily blow against the page P at the destination position although the page-turning device 3 has a simple configuration.

Further, the destination position inclined angle is adjustable. Thereby, even if thicknesses of the books B are different from each other, the destination position inclined angle can be adjusted for each thickness such that the page P at the destination position can be effectively blown by the wind.

A restoring force of the page P to return to the departure position changes in accordance with the amount of pages at the destination position. However, since the air volume of the blower 5 is adjustable, the air volume can be adjusted in accordance with the amount of pages at the destination position. Therefore, a balance of an ability to prevent pages from returning, electricity and noise reduction (silent performance) can be appropriately adjusted.

Further, since the air volume of the blower 5 is adjusted on the basis of the amount of turned pages P, the air volume can be automatically adjusted to the most appropriate volume.

As the amount of the pages P at the destination position gets larger, the restoring force of the page P gets stronger. However, since the air volume after many pages have been turned is larger than the air volume after only a few pages have been turned, the pages P are reliably prevented from returning to the departure position even after the amount of pages P at the destination position has increased.

Further, the direction of a wind from the blower 5 is adjustable. Therefore, although the amount of pages P at the departure position is changeable, the wind direction can be adjusted so that a wind passes above the page P at the departure position to blow against the page P at the destination position.

Further, the wind direction of the blower 5 is adjusted on the basis of the amount of turned pages P (the value N). Thereby, the wind direction can be automatically adjusted to the most appropriate direction.

As the amount of the pages P at the destination position increases, the thickness of the pages P at the departure position decreases. However, the wind direction after many pages have been turned is made downward as compared with the wind direction after a few pages have been turned. Therefore the pages P are reliably prevented from returning even after the amount of turned pages (the value N) has changed.

Further, since the document camera system 1 with the camera 22 which images the pages P of the book B is provided with the page-turning device 3, the pages P can be reliably imaged while the pages P are automatically turned.

Further, since the turning unit 30 and the blower 5 are outside the angle of view of the camera 22 when the camera 22 images the pages P, the turning unit 30 and the blower 5 are prevented from getting into the images, so that appropriate images can be obtained.

The invention is not limited to the above embodiment, and several modifications can be applied thereto appropriately.

In the above embodiment, the sticking part 35 has the adhesive component 352, and the sticking part 35 sticks to a page P by the adhesive power of the adhesive component 352. However, it is also possible that the sticking part 35 sticks to a page P by suction etc. In this case, for example, a communicating hole which communicates with an inner space of the sticking part 35 is formed on the circumference surface of the sticking part 35 so that the inner space of the sticking part 35 and a pump communicate with each other, and by driving the pump such that the inner space is under negative pressure, sucking power acts onto the communicating hole.

Thereby, the sticking part 35 can stick to a page P by the suction power.

Other than suction and adhesion, sticking by electrostatic attraction can be applied to the sticking part 35.

Figure 14:
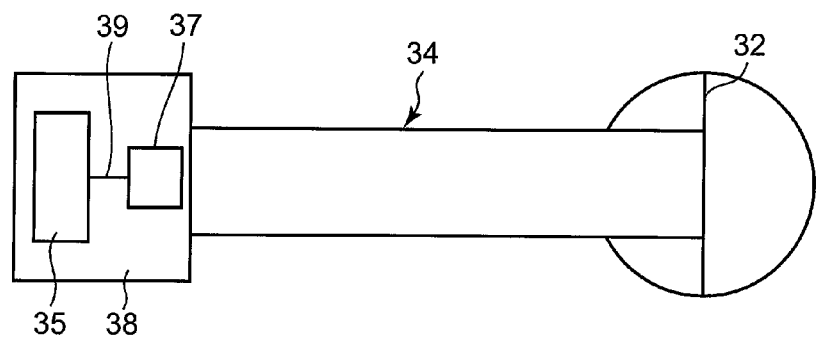
FIG. 14 is a schematic view showing a modification of the sticking part.

In the above embodiment, the drive shaft 39 of the second drive unit 37 is disposed along a direction perpendicular to the longitudinal direction of the arm part 34. However, as shown in FIG. 14, the second drive unit 37 may be disposed such that the drive shaft 39 is along the longitudinal direction of the arm part 34. In this case, the rotation axis of the sticking part 35 is also along the longitudinal direction, so that the arm part 34, the second drive unit 37 and the sticking part 35, as a whole, can be compact.

In the above embodiment, the air volume is automatically switched between two levels according to whether or not the amount of turned pages P (the value N) is more than the first threshold. However, it is also possible to set a plurality of thresholds so that the air volume is gradually changed through more levels.

Figure 15:
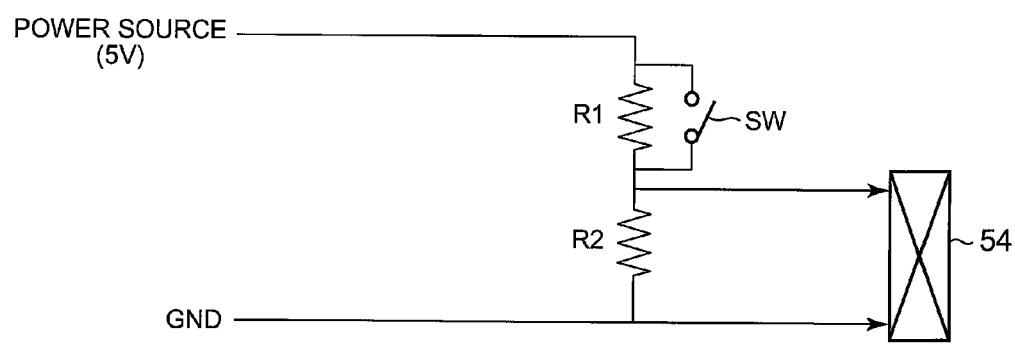
FIG. 15 shows a modification of the embodiment illustrating a circuit in a case that an air volume of a fan unit of a blower is switched.

Further, it is also possible to switch the air volume by hand. For example, FIG. 15 illustrates a circuit in a case where an air volume of the fan unit 54 of the blower 5 is switched. As shown in FIG. 15, the fan unit 54 is connected to a power source and the ground via two resistances R1, R2. A switch SW is connected to the resistance R1 in parallel. When the power source is ON and the switch SW is OFF, a voltage which has passed through the resistance R2 is applied to the fan unit 54. On the other hand, when the switch SW is OFF, a voltage which has passed through the two resistances R1, R2 is applied to the fan unit 54. Thus the different voltages are applied to the fan unit 54 by turning the switch SW ON/OFF. Thereby, the air volume shifts between two levels (OFF: low speed, ON: high speed).

At Steps S15 and S16 shown in the flowchart of FIG. 11, the switch SW can be automatically closed or opened according to which one is larger between the value N and the first threshold.

It is also possible that the wind direction of the blower 5 is adjusted by hand. For example, the fan unit 54 includes movable fins for adjustment of the wind direction. The wind direction is adjusted by adjusting inclination of the fins by hand.

Further, it is also possible that the wind direction is gradually changed in accordance with the value N in the same manner as the air volume.

Sometimes the page P at the departure position rises due to resilience of the page P itself, etc. It is not appropriate to image the page P in this state since a twisted (distorted) image is picked up. In order to prevent the page P from rising, the wind may be directed somewhat downward as compared with the wind direction shown in FIG. 3 so that a part of the wind blows the page P at the departure position (the page P to be imaged) from above.

Further, it is also possible that a position of the wind is adjusted by adjusting the height of the blower base 53.

Figure 16:
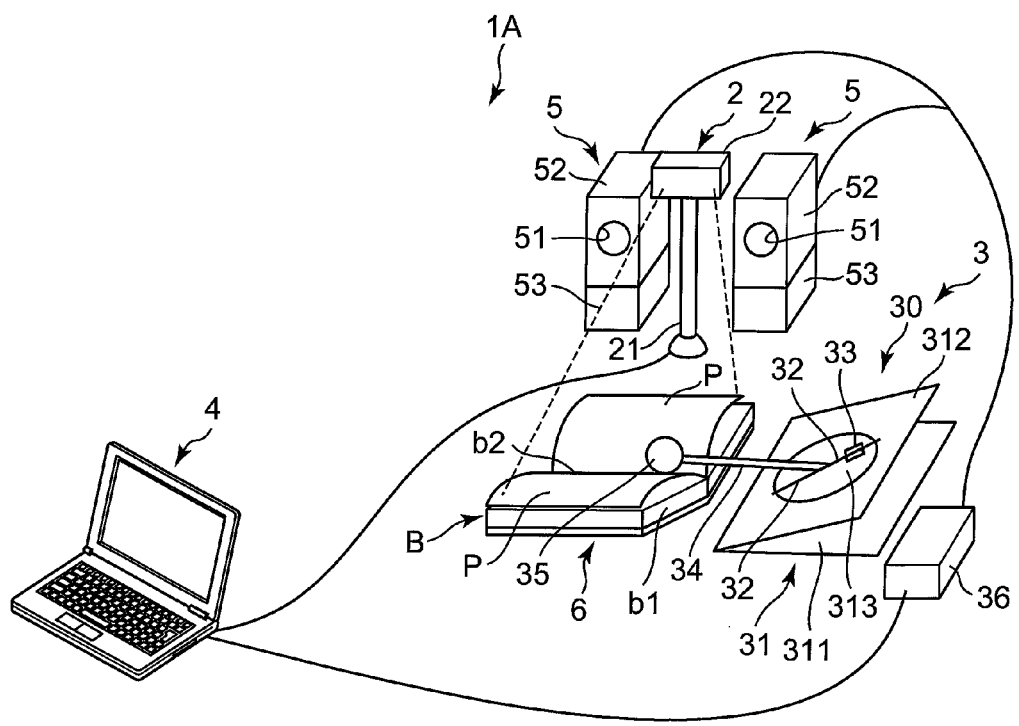
FIG. 16 shows a modification of the embodiment and is a perspective view schematically showing the configuration of a document camera system with two blowers.

In the above embodiment, only one blower 5 is provided. However, it is also possible that a plurality of blowers 5 is provided. For example, FIG. 16 is a perspective view schematically showing the configuration of a document camera system 1A with two blowers 5. As shown in FIG. 16, the document camera 2 is disposed between the two blowers 5. This arrangement is preferable because the distance between the pages P on one side and the camera 22 is shortened when the pages P on only the side of the pages P of the opened book B is imaged.

In the above embodiment, the amount of pages P turned by the turning unit 30 is detected by counting turned pages P. However, it is also possible that a thickness sensor is provided. The thickness sensor measures the thickness of the pages P at the destination position and the pages P at the departure position. The control unit 36 calculates the amount of turned pages on the basis of a measured result of the thickness sensor. In this case, the thickness sensor and the control unit 36 function as a page-turn-amount detector of the present invention.

Though several embodiments of the present invention are illustrated, the scope of the invention is not limited to the above embodiments but includes the scope of claims attached below and the scope of their equivalents.

What is claimed is:

1. A method for turning a page of an opened book, the method comprising:
    supporting the book with a support base such that (i) a page to be turned is horizontal at a departure position, and (ii) the page forms a predetermined angle with a horizontal plane at a destination position;
    sticking an adhesive component to the page horizontally supported at the departure position;
    turning the page at the departure position with the adhesive component toward the destination position;
    sending air above the opened book with a blower toward the destination position from the departure position against the page being turned at the destination position; and
    imaging a page which is to be turned next and is horizontally supported at the departure position, while air from the blower is blown against the page forming the predetermined angle with the horizontal plane at the destination position.

2. The method according to claim 1, further comprising adjusting an air volume of the blower.

3. The method according to claim 2, further comprising:
    detecting an amount of pages turned by the adhesive component,
    wherein the adjusting adjusts the air volume of the blower based on the detected amount of pages.

4. The method according to claim 3, wherein the adjusting adjusts the air volume of the blower such that when the detected amount of pages is large, the air volume of the blower is adjusted to be larger than when the detected amount of pages is small.

5. The method according to claim 1, further comprising adjusting a moving direction of air from the blower.

6. The method according to claim 5, further comprising:
    detecting an amount of pages turned by the adhesive component,
    wherein the adjusting adjusts the moving direction of the air from the blower based on the detected amount of pages.

7. The method according to claim 6, wherein the adjusting adjusts the moving direction of the air from the blower when the detected amount of pages is large to be lowered with respect to the moving direction of the air from the blower when the detected amount of pages is small.

8. The method according to claim 1, wherein the page being turned is separated from the adhesive component by the blower sending air above the opened book and blowing against the page being turned.

9. The method according to claim 1, wherein the predetermined angle is in a range of 30 to 45 degrees.

* * * * *